Patented July 15, 1941

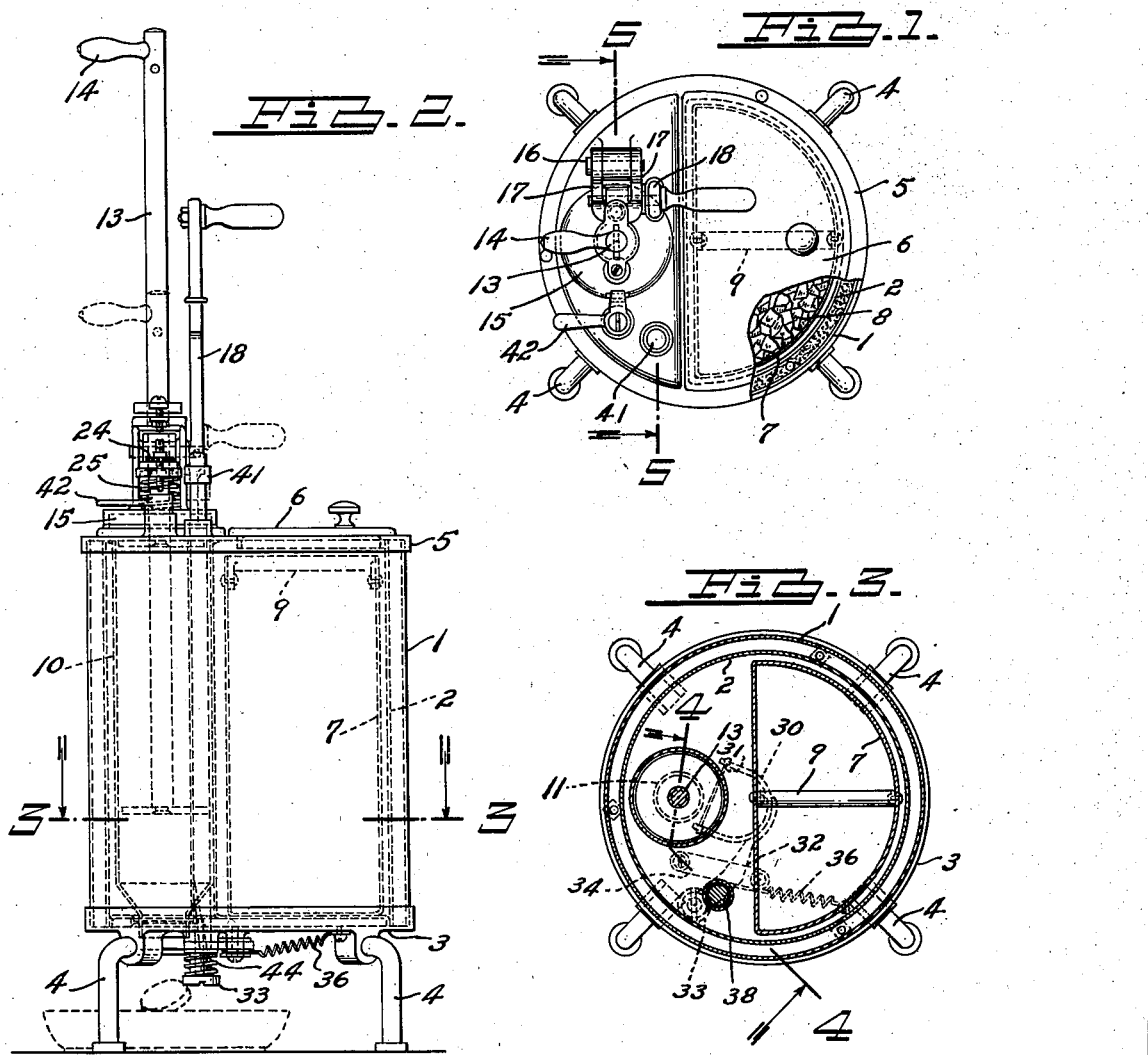

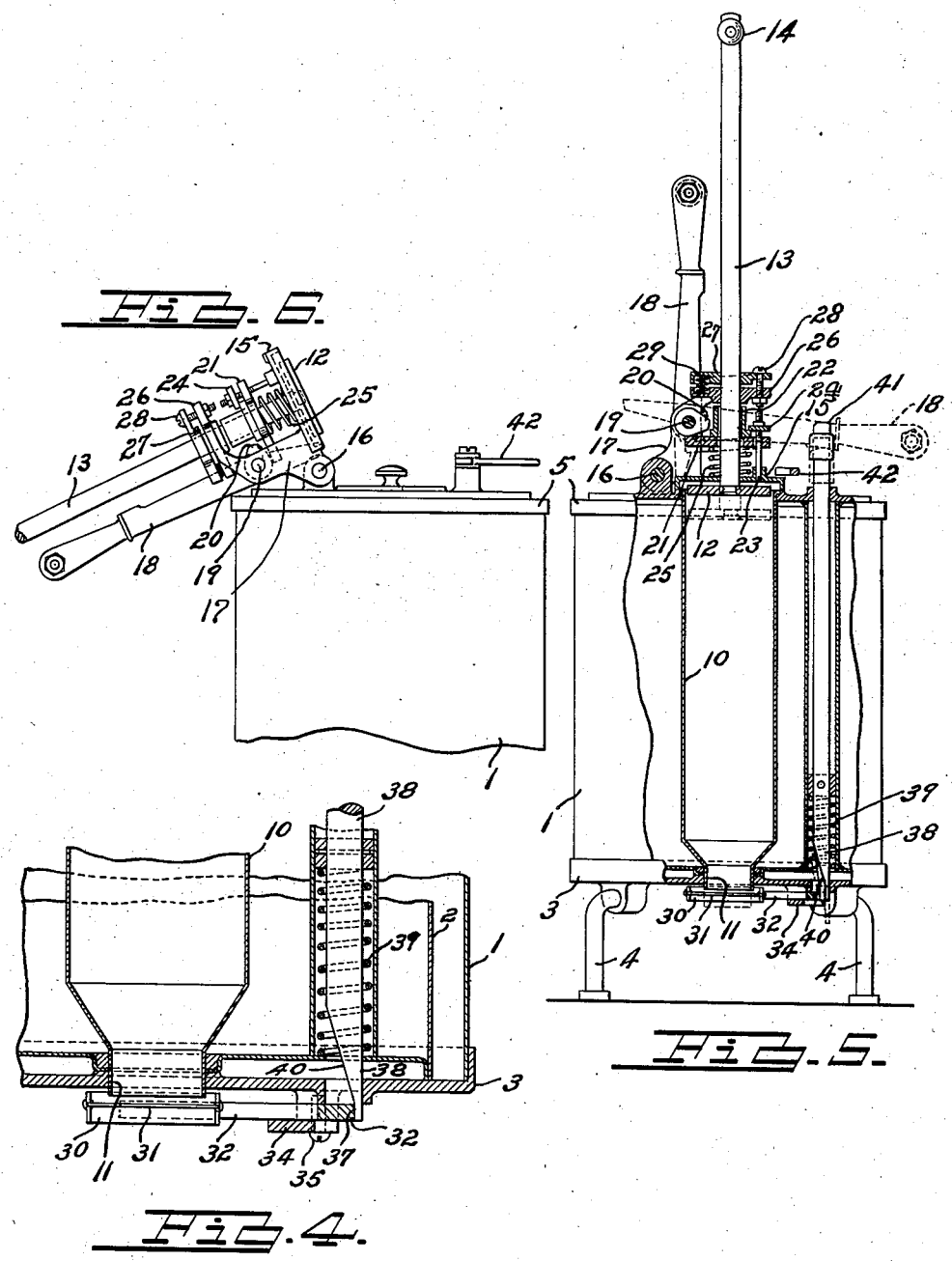

2,248,980

UNITED STATES PATENT OFFICE 2,248,980

BUTTER DISPENSING MACHINE

Bernt Garllus, Detroit, Mich., assignor to Louis N. Prentis, Detroit, Mich.

Application May 5, 1939, Serial No. 272,008

3 Claims. (Cl. 31—13)

This invention relates to butter dispensing machines and the object of the invention is to provide a machine arranged to discharge butter through a discharge orifice and provided with means in connection with the discharge mechanism for cutting off pats of butter of a predetermined thickness upon each operation of the machine.

Another object of the invention is to provide a machine having a butter containing compartment provided with a plunger which is fed downwardly to a predetermined extent by arcuate movement of a crank, the arrangement being such as to discharge the butter to a predetermined extent upon each crank operation and arranged to cut off the extruded butter upon the completion of the crank operation.

A further object of the invention is to provide a mechanism for feeding the plunger downwardly by the crank so that the plunger is first advanced and upon the completion of the advancing stroke of the plunger the extruded butter is cut off and upon return stroke of the crank the butter cutter is returned to the original position, the plunger is held in position and the plunger operating crank is returned to position for succeeding movement of the plunger by the lever.

Another object of the invention is to provide an insulated container enclosing the butter chamber and an ice chamber to maintain the butter at a firm consistency for feeding.

A further object of the invention is to provide a machine in which roll butter or bulk butter may be inserted in the butter cylinder and will discharge individual servings of butter by operation of the lever, reducing waste of butter and allowing the butter to be used in a less expensive form than in brick form.

A further object of the invention is to provide a machine in which the thickness of the butter servings may be regulated to give the desired size of serving upon each operation.

Another object of the invention is to provide a sanitary chamber for the butter which is maintained in a clean condition by the movement of the butter through the container.

These objects and the several novel features of the invention are hereinafter more fully described and claimed and the preferred form of construction by which these objects are attained is shown in the accompanying drawings in which—

Fig. 1 is a plan view of a butter dispensing machine embodying my invention.

Fig. 2 is a side elevation thereof.

Fig. 3 is a section taken on line 3—3 of Fig. 2.

Fig. 4 is a section taken on line 4—4 of Fig. 3.

Fig. 5 is a section taken on line 5—5 of Fig. 1.

Fig. 6 is a view of the top of the machine with the parts in position for loading.

As shown in Figs. 1, 2, 3 and 5, the device comprises a cylindrical casing formed of an outer wall 1 and an inner wall 2 providing a space therebetween which may be filled with insulating material. The device is provided with a base or bottom 3 shown in Figs. 2 and 5 having supporting legs 4 extending therefrom as shown. The top 5 of the casing is provided with a semi-circular opening on one side arranged to be closed by the cover member 6 and immediately beneath this cover member is a semi-circular casing 7 which is arranged to be filled with ice 8 as shown in Fig. 1. This casing 7 is provided with a handle 9 for lifting the ice compartment out of the casing and the compartment 7 is arranged to keep the device cool including the butter in the container. Secured in the top and bottom of the casing adjacent the ice chamber is a cylindrical butter chamber 10 which is arranged to be filled with butter and is provided with a discharge orifice 11 through the bottom which may be of any desired shape. A plunger 12 fits into the upper end of the cylinder 10 and is provided with a plunger rod 13 as shown having a handle 14 at the upper end by means of which the plunger may be lifted.

The casing is provided with a cap 15 at the top which is pivoted on the pivot 16 so that this cap 15 with the plunger may be turned to the position shown in Fig. 6 to allow butter to be inserted into the cylinder 10.

A double arm 17 is provided which is formed integrally with the cap 15 and a lever 18 is pivoted in the upper end of the arms 17 and is secured to the pivot shaft 19. Secured to the pivot shaft 19 between the arms 17 is a cam 20 riding in contact with a plunger feed washer 21 which is provided with a collar 22 through which the plunger stem 13 extends. A threaded rod 23 extends upwardly from the cap 15 through an aperture in the member 21 and is provided with a knurled nut 24 on the upper end engaging over a flange on the collar 22 to limit upward movement of the collar and feed washer 21 by the spring 25. By this arrangement when the lever 18 is turned to the dotted position shown in Fig. 5 the cam 20 is turned to press downwardly on the edge of the feed washer 21, thus bindingly engaging the plunger stem and as the movement of the cam is continued the feed washer is moved downwardly, carrying the plunger and plunger stem therewith.

The arms 17 as shown in Figs. 1, 5 and 6 are formed integrally with a member 26 through which the plunger stem 13 extends, and a lock member 27 is also fitted about the plunger stem and is secured in spaced relation to the member 26 by the spacing bolt 28 shown in Fig. 5. A spring 29 is interposed between the opposite edges of the two members causing the member 27 to normally rise to bindingly engage the plunger stem by its wedging action. This member 27 normally prevents raising of the plunger stem 13, but when the lever 18 is turned from the position shown in full lines to that shown in dotted lines in Fig. 5 the plunger stem is moved downwardly by the cam 20 and the plate 27 will tend to follow the plunger stem and allow such movement of the plunger stem in a downward direction only.

As the lever 18 is again turned back to the position shown in full lines in Fig. 5 the cam 20 is turned back to the position shown in full lines allowing the spring 25 to raise the plate 21 into engagement with the low portion of the cam 20. At the same time, the plunger stem cannot move upwardly because of the fact that the member 27 resists such upward movement and holds the stem 13 the more tightly if force is used to move it upwardly. By this arrangement, the plunger stem is moved downwardly upon each operation of the lever 18, so that the plunger will travel down through the butter cylinder 10 step by step, as normally determined by the throw of the cam 20. These steps may be further reduced in height by turning the nut 24 downwardly to move the collar 22 and plate 21 downwardly, so that only a portion of the cam throw is effective in moving the plunger. By this arrangement, when the cylinder 10 is filled with butter, each downward movement of the plunger will extrude a predetermined amount of butter through the discharge opening 11. This opening may be round as shown or square, star shaped or any other shape in which it is desired to form the butter pats. As the butter is extruded, it is necessary to cut the pats off in the desired thickness, and this thickness may be regulated by means of the knurled nut 24 controlling the stroke of the plunger.

The device for cutting off the butter pats comprises a U-shaped member 30 shown in Figs. 3, 4 and 5 and a wire 31 is supported across the open end of the U-shaped member 30 for cutting the butter. This U-shaped member 30 is supported in horizontal position on an arm 32 which is pivotally mounted on a screw 33 having a spring 44 forcing the end of the arm 32 upwardly on this screw. The U-shaped member 30 and consequently the wire 31 are maintained constantly in a horizontal position by the arm 32.

The position of the screw 33 and of the arm 32 is shown in dotted lines in Fig. 3. This arm 32 rides on a bracket 34 which is attached to the bottom of the housing on screws 35. A spring 36 shown in Figs. 2 and 3 is attached to the arm 32 and tends to pull the arm against the face 37 of the plunger cam 38. This cam is normally held in the raised position by the spring 39 shown in Figs. 4 and 5 and is provided with an angular face 40 for turning the cutter on the pivot screw 33. The upper end of the plunger cam is provided with a cap 41 shown in Figs. 1, 2 and 5, and as the lever 18 is turned to the dotted position shown in Fig. 5 it engages this cap and pushes the plunger downwardly. As this plunger is pushed downwardly the angular face 40 engaging the arm 32 first presses the end of the arm downwardly on the screw 33 against the tension of the spring 44, so that the bracket 34 acts as a fulcrum and by this movement the upper edge of the U member 30 is moved upwardly into engagement with the bottom of the housing, and continued downward movement of the cam plunger at this time turns the arm 32 on the pivot screw 33 by means of the angular cam face 40, thus moving the wire 31 across the discharge opening 11 and the upper edge of the U member 30 is limited in its cutting movement by engagement of its upper edge with the extending lower end of the discharge mouth 11. Upon upward movement of the lever 18 the spring 39 will move the cam plunger 38 upwardly, and at this time the spring 44 will raise the pivoted end of the lever 32 on the pivot screw 33, allowing the U member 30 to drop slightly, and also at this time the spring 36 will turn the arm 32 back to its original position. By dropping the member 30, the wire 31 is moved away from the butter and thus the wire is prevented from scraping off any additional butter on its back stroke. The opening 11 is shown as being a round discharge opening, but, as hereinbefore described, this may be square or any other desired shape.

By turning the latch 42 shown in Fig. 1 off from the cap 15 and raising the plunger 12 the butter feeding head may be turned back to the position shown in Fig. 6 to allow butter to be inserted into the cylinder 10. This cylinder 10 is preferably of a size to take standard roll butter but may be filled with bulk butter if desired and it is to be noted that any amount of butter may be inserted in this cylinder, as the operation is the same whether the butter completely or only partially fills the cylinder. When the cylinder is partially filled the lever 18 may be turned to the dotted position, at which time, by means of the handle 14, the plunger may be pushed down into engagement with the butter, and from then on the feeding of the plunger may be accomplished by turning the lever 18. By the provision of the ice container 7 the butter may be maintained in a fairly hard condition so as not to feed too easily from the cylinder.

From the foregoing description it becomes evident that the device is very simple and efficient in operation, will not easily get out of order, will automatically produce pats of the desired size and thickness from bulk butter and provides a device which accomplishes the objects described.

Having thus fully described my invention, its utility and mode of operation, what I claim and desire to secure by Letters Patent of the United States is—

1. In a butter dispensing machine, a casing, a cylindrical butter compartment mounted in the casing and having a reduced diameter discharge end extending through the bottom of the casing, a plunger supported in the top of the casing and movable longitudinally step by step through the compartment to discharge the butter therefrom, manually operable means for advancing the plunger step by step through the compartment, means normally preventing return movement of the plunger, and means for cutting off the extruded butter at the end of each step movement of the plunger, a vertically movable member including a cam adapted on movement of said member in one direction to actuate the cutter on the cutting movement, said member being moved to actuate the cutter by said manually operable means for moving the plunger, and spring means for restoring said vertically movable member to original position upon return of the manually operable means to position for again advancing the plunger.

2. In a butter dispensing machine, a casing, a cylindrical butter compartment mounted in the casing and having a reduced discharge end extending through the bottom of the casing, a plunger movable longitudinally of the compartment to discharge the butter therefrom, a pivoted lever mounted on the top of the casing and turnable to advance the plunger to a predetermined extent, a pivoted cutting mechanism for cutting off the extruded butter, a reciprocable cam actuatable by the said lever upon completion of each movement of the plunger, a spring for returning the cam, and a spring for returning the cutter when released by the cam.

3. In a butter dispensing machine, a casing, a cylindrical butter compartment having a discharge opening at the bottom of the casing, a plunger movable longitudinally of the compartment to discharge the butter therefrom, means for advancing the plunger through the compartment in steps of predetermined length, means for cutting off the extruded butter subsequent to each step movement of the plunger, means for operating the said cutting off means comprising a reciprocable rod having a wedge-like end providing a cam for moving the cutter in one direction, a spring for returning the rod and cam to the original position, and a spring for returning the cutter to original position when released by the cam.

BERNT GARLLUS.